UNITED STATES PATENT OFFICE.

FREDERICK C. ATKINSON, OF INDIANAPOLIS, INDIANA.

BAKING-POWDER AND PROCESS OF MAKING SAME.

1,264,592.   Specification of Letters Patent.   Patented Apr. 30, 1918.

No Drawing.   Application filed May 21, 1917.   Serial No. 169,922.

*To all whom it may concern:*

Be it known that I, FREDERICK C. ATKINSON, a citizen of the United States, residing at Indianapolis, Marion county, and State of Indiana, have invented and discovered certain new and useful Improvements in Baking-Powders and Processes of Making Same, of which the following is a specification.

My invention relates to baking powders and processes of producing the same. Its objects are to produce a baking powder which is non-effervescing and which is adapted to inhibit the release of the raising gases thereof until the application of heat above that of atmospheric temperature, and in which the medium effecting these functions also constitutes a filler which possesses shortening qualities.

With these objects in view, my invention is embodied in preferable form in the product hereinafter described.

In producing the product the basic constituent of the baking powder and the acid constituent thereof are separated from one another by a fatty material which forms a protective film about the particles of the powder with which it is mixed, and which material is insoluble in water, but adapted to melt at elevated temperatures such as used in cooking, and which also preferably provides a shortening medium. The material used is preferably a melted, hardened fat and the preferred example of such wax-like fats which is employed is melted hydrogenated corn oil. In forming the product either the sodium bicarbonate or other suitable active alkaline carbonate constituent or the tartaric acid (cream of tartar) or other acid which may be employed is first separately mixed with the hydrogenated corn oil in a melted state which has the effect of coating the particles of the powder constituent with the fat and thus inhibiting a chemical combination between the acid and the base when the product is mixed with water, except under such a temperature as will melt the fat. The liquid fat may be either merely mixed with the powder constituent and the product thus formed ground to reduce it to a fine pulverulent condition or the mixture may be initially produced in such pulverulent condition by spraying the liquid fat into the base powder or the acid powder. The product may also be formed by mixing both the acid and the base separately with a liquid fat and then grinding either mixture separately or both together to reduce the product to its required fine, pulverulent condition, or by spraying each constituent separately and then merely mixing the coated ingredients. Thus, either one or both of the active elements may be treated with the fat with the effect of preventing or inhibiting chemical combination of the elements when mixed with water. In thus treating the powder constituents it is not necessary that all the particles of the powder be coated but merely the major part of the mass and in fact it may be desirable to leave some part of the body uncoated.

Instead of coating either or both of the powder constituents with a fat in liquid form, the baking powder may be formed by mixing hardened fat in a powder form, obtained by spraying or grinding the hydrogenated fat, directly with both of the two powder constituents constituting the active elements, the mixing action serving to rub the fat against the particles of the baking-powder sufficiently to cause an adherence thereto which will protectively coat the same. In this process the inhibition of effervescence against atmospheric moisture, and to some extent against the water used in making the dough will be also accomplished, although this method is not so effective as that employing the fat in liquid form. In all these examples of the process the fat is reduced to a pulverulent condition and the final product is a dry powder.

With a baking powder thus formed the same, or that portion of the same which is coated, will be insoluble in water, and hence will not effervesce when it is mixed with flour and water preliminarily to baking, and the chemical combination between the acid and the base and the consequent release of the raising gases will take place only when such a temperature such as that which is used in cooking is applied thereto so that these gases are released only at the time of cooking. The advantage of this function is that the effect of the gases is not partially dissipated and wasted during the step of mixing the flour and baking powder with the water. This advantage is of particular value in the mixing and cooking of such articles as griddle cakes and waffles.

The fat serves as a substitute for the usual starch filler when used in sufficient quantities, probably about fifty per cent. of the mass and may also serve as a shortening medium. This function of providing a filler which has a shortening effect is important in itself, and independent of the non-effervescing function.

The term "fat" as used in this specification comprises fats proper and fatty oils.

Having thus described my invention, what I claim is:—

1. A baking powder compound having a chemical constituent thereof adapted to combine with other constituents to effect the gasifying and raising functions of the baking powder, mixed with a dry material which is insoluble in water and which will melt at cooking temperatures, such material serving to prevent the chemical combination between the elements until the release of the same by the application of said higher temperatures, the final product being in dry powdered form.

2. A baking powder having an active element thereof mixed with a hard fat in powder form and which fat is resistant to the solvent action of the water used in forming the dough.

3. A baking powder having an active element thereof mixed with a hardened fat in powder form.

4. A baking powder having the body of an active element thereof mixed with hydrogenated pulverulent corn oil.

5. A baking-powder mixed with a fat in powder form.

6. A baking powder mixed with a fat in powder form and of sufficient quantity to constitute a filler and a shortening medium.

7. The process of forming a baking powder which consists in mixing one or both of the active constituents of baking powders separately with a hardened fat in molten state, and which is resistant to the solvent action of the water used in the dough and at the same time with such mixing or subsequently thereto, reducing the completed product to the form of a powder.

In witness whereof, I have hereunto set my hand and seal at Indianapolis, Indiana, this 10 day of May, A. D. nineteen hundred and seventeen.

FREDERICK C. ATKINSON. [L.S.]

Witnesses:
H. P. DOOLITTLE,
M. S. SHULER.